US012643612B2

(12) United States Patent
Yoshida et al.

(10) Patent No.: US 12,643,612 B2
(45) Date of Patent: Jun. 2, 2026

(54) VEHICLE REAR STRUCTURE

(71) Applicant: HONDA MOTOR CO., LTD., Tokyo (JP)

(72) Inventors: Masayasu Yoshida, Wako (JP); Hiroyo Miyanaga, Wako (JP); Satoru Kawabe, Wako (JP); Yasunori Watanabe, Wako (JP); Hisashi Suzuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 378 days.

(21) Appl. No.: 18/215,202

(22) Filed: Jun. 28, 2023

(65) Prior Publication Data

US 2024/0017772 A1     Jan. 18, 2024

(30) Foreign Application Priority Data

Jul. 14, 2022     (JP) .................................. 2022-113175

(51) Int. Cl.
B62D 25/08        (2006.01)
B62D 25/04        (2006.01)

(52) U.S. Cl.
CPC ........... B62D 25/088 (2013.01); B62D 25/04 (2013.01)

(58) Field of Classification Search
CPC .. B62D 25/02; B62D 25/0207; B62D 25/087; B62D 21/15; B62D 21/152; B62D 27/023
USPC ......... 296/203.01, 4, 193.08, 187.11, 29, 30, 296/198, 193.06
See application file for complete search history.

(56) References Cited

U.S. PATENT DOCUMENTS

| | | | | |
|---|---|---|---|---|
| 8,899,667 | B2 * | 12/2014 | Okamachi ............ | B62D 25/087 296/30 |
| 11,008,046 | B2 * | 5/2021 | Nishioka ................ | B62D 25/20 |
| 11,130,529 | B2 * | 9/2021 | Okamoto ............... | B62D 25/02 |
| 11,642,993 | B2 * | 5/2023 | Gomez ................ | B60N 2/6027 296/68.1 |
| 2007/0138837 | A1 * | 6/2007 | Tomioka ................ | B62D 25/02 296/203.04 |
| 2013/0169005 | A1 | 7/2013 | Okamachi et al. | |
| 2019/0344835 | A1 | 11/2019 | Nishioka et al. | |

FOREIGN PATENT DOCUMENTS

| | | | | |
|---|---|---|---|---|
| CN | 101500846 B | * | 7/2013 | ............. B60P 1/003 |
| CN | 103183061 | | 7/2013 | |
| CN | 110155182 | | 8/2019 | |

(Continued)

OTHER PUBLICATIONS

DE102017009123 Text (Year: 2018).*

(Continued)

*Primary Examiner* — Jacob S. Scott

(74) *Attorney, Agent, or Firm* — Amin, Turocy & Watson, LLP

(57) ABSTRACT

A vehicle rear structure includes: a rear panel having a rear panel center member extending in a vehicle width direction and a rearward connection portion extending upward from the rear panel center member; a forward connection portion located forward of the rear panel; and a rear panel support member extending in a front rear direction above the rear panel center member and bridging between the rearward connection portion and the forward connection portion.

6 Claims, 3 Drawing Sheets

(56)            References Cited

FOREIGN PATENT DOCUMENTS

| | | | | |
|---|---|---|---|---|
| DE | 102017009123 A1 * | 10/2018 | ............. | B62D 25/02 |
| JP | 2005-306192 | 11/2005 | | |
| JP | 2009269491 A * | 11/2009 | | |
| JP | 2019-137351 X | 8/2019 | | |
| JP | 2023053481 A * | 4/2023 | | |
| WO | WO-2014069373 A1 * | 5/2014 | ........... | B62D 29/046 |

OTHER PUBLICATIONS

Translation CN 101500846 (Year: 2013).*
Translation JP 2009269491 (Year: 2009).*
Translation 2023053481 (Year: 2023).*
Translation WO 2014069373 (Year: 2014).*
Chinese Office Action for Chinese Patent Application No. 202310726045.6 mailed Mar. 16, 2026.

* cited by examiner

VEHICLE REAR STRUCTURE

CROSS-REFERENCE TO RELATED APPLICATION

Priority is claimed on Japanese Patent Application No. 2022-113175, filed Jul. 14, 2022, the content of which is incorporated herein by reference.

BACKGROUND OF THE INVENTION

Field of Invention

The present invention relates to a vehicle rear structure.

Description of Related Art

As a vehicle rear structure, a rear side member, a bumper reinforcement connecting a rear end of rear a side bumper in a vehicle width direction, a rear panel reinforcement provided above the bumper reinforcement, and a load transfer beam connecting the rear panel reinforcement and a rear pillar reinforcement, (See, for example, JP-A-2005-306192).

According to this configuration, in the event of a rear-end collision of a vehicle, the rear side member is subjected to the collision input via the bumper reinforcement and the load transfer beam is subjected to the collision input via the rear panel reinforcement, thereby it is shown that the concentration of the collision input on the rear side member can be avoided.

SUMMARY OF THE INVENTION

In the conventional technology described above, the rear panel reinforcement is installed inside (in front of) a rear bumper. Therefore, in the configuration of the conventional technology, both the bumper reinforcement and the rear panel reinforcement are installed in the lower part of the vehicle body. In this case, there was still room for improvement in terms of collision safety in a wide range of a vertical direction at the rear of the vehicle body. In the conventional technology, for example, when a collision occurs with a collision object offset upward against the bumper reinforcement or the rear panel reinforcement, there is a possibility that load transfer to a load transfer beam will not be effective.

Aspects of the present invention have been made in view of the above circumstances, and it is an object of the present invention to provide a vehicle rear structure that can effectively reduce a collision load from the rear in a wide range of the vertical direction of the vehicle and improve collision safety.

In order to solve the above-mentioned problems and achieve the above-mentioned purposes, the present invention adopts the following aspects.

(1) A vehicle rear structure according to an aspect of the present invention includes: a rear panel having a rear panel center member extending in a vehicle width direction and a rearward connection portion extending upward from the rear panel center member; a forward connection portion located forward of the rear panel; and a rear panel support member extending in a front rear direction above the rear panel center member and bridging between the rearward connection portion and the forward connection portion.

According to this aspect, for example, in a rear collision, a collision load input from the rear of the vehicle is transmitted to both the rear panel and the rear panel support member. As a result, the collision load can be dispersed and the collision load can be effectively reduced.

Furthermore, in this aspect, since the rear panel center member and the rear panel support member are connected via the rearward connection portion, a lower area of the rear panel (a portion of the rear panel located below the rear panel support member) is displaced forward starting from the rear panel support member when a collision load is input. As a result, the collision load can be reduced by a tension generated in the lower area of the rear panel. In this case, the deformation of the rear panel support member itself can be suppressed, the amount of the collision object entering the vehicle can be reduced, and the impact load can be reduced. As described above, in this aspect, since the lower area of the rear panel is displaced starting from the rear panel support member in the rear collision, the rear panel support member can be positioned relatively high up and the collision load can be reduced by equivalent behavior to the collision load input to the lower area of the rear panel. Therefore, it is easy to ensure the same collision safety in a wide range of the vertical direction.

(2) In the above aspect (1), the forward connection portion may include a wheelhouse main body in which a portion of a rear wheel is accommodated and a damper load receiving portion provided inside a vehicle with respect to the wheelhouse main body, and a front end of the rear panel support member may be connected to the damper load receiving portion.

According to this aspect, the front end of the rear panel support member is connected to a damper base that reinforces the wheelhouse main body, thereby enabling the rear panel support member to be strongly supported from the front. As a result, the rear panel support member itself can be restrained from being displaced forward when a collision load is input. As a result, the lower area of the rear panel can be effectively displaced, and the tension generated in the lower area of the rear panel can easily reduce the collision load.

(3) In the above aspect (2), the damper load receiving portion may include a top wall portion covering the wheelhouse main body from above and a corner portion extending downwardly from an outer edge of the top wall portion and covering the wheelhouse main body from rear, and the front end of the rear panel support member may be connected across a ridge portion between the top wall portion and the corner portion of the damper load receiving portion.

According to this aspect, the rigidity of the connection point of the rear panel support member can be easily secured, and thus the rear panel support member itself can be more reliably restrained from being displaced forward when a collision load is input.

(4) In the above aspect (1), the rearward connection portion may have a closed cross-sectional structure, and a reinforcement member may be provided inside a portion of the rearward connection portion to which a rear end of the rear panel support member is connected.

According to this aspect, it is easier to secure the strength of the rearward connection portion, and thus it is possible to suppress the rupture of the portion of the rearward connection portion that is connected to the rear panel support member when a collision load is input. This allows the lower area of the rear panel to be effectively displaced, and the tension generated in the lower area of the rear panel can easily reduce the collision load.

(5) In the above aspect (1), the rear panel support member may extend downwardly as the rear panel support member extends rearward.

According to this aspect, the lower area of the rear panel is easily displaced forward at a time of a collision load input, starting from the rear panel support member. This allows the tension generated in the lower area of the rear panel to effectively reduce the collision load.

(6) In the above aspect (1), the rearward connection portion may include a pair of rear pillars extending upwardly from both ends of the rear panel center member to divide a cargo compartment opening of the vehicle, and the rear panel support member may bridge each of the pair of rear pillars and the forward connection portion.

According to this aspect, the collision safety can be improved while securing an opening area of the cargo compartment opening of the vehicle.

According to the present invention, it is possible to effectively reduce the collision load from the rear in a wide range of the vertical direction of the vehicle and improve collision safety.

DETAILED DESCRIPTION OF THE INVENTION

Figure 1:
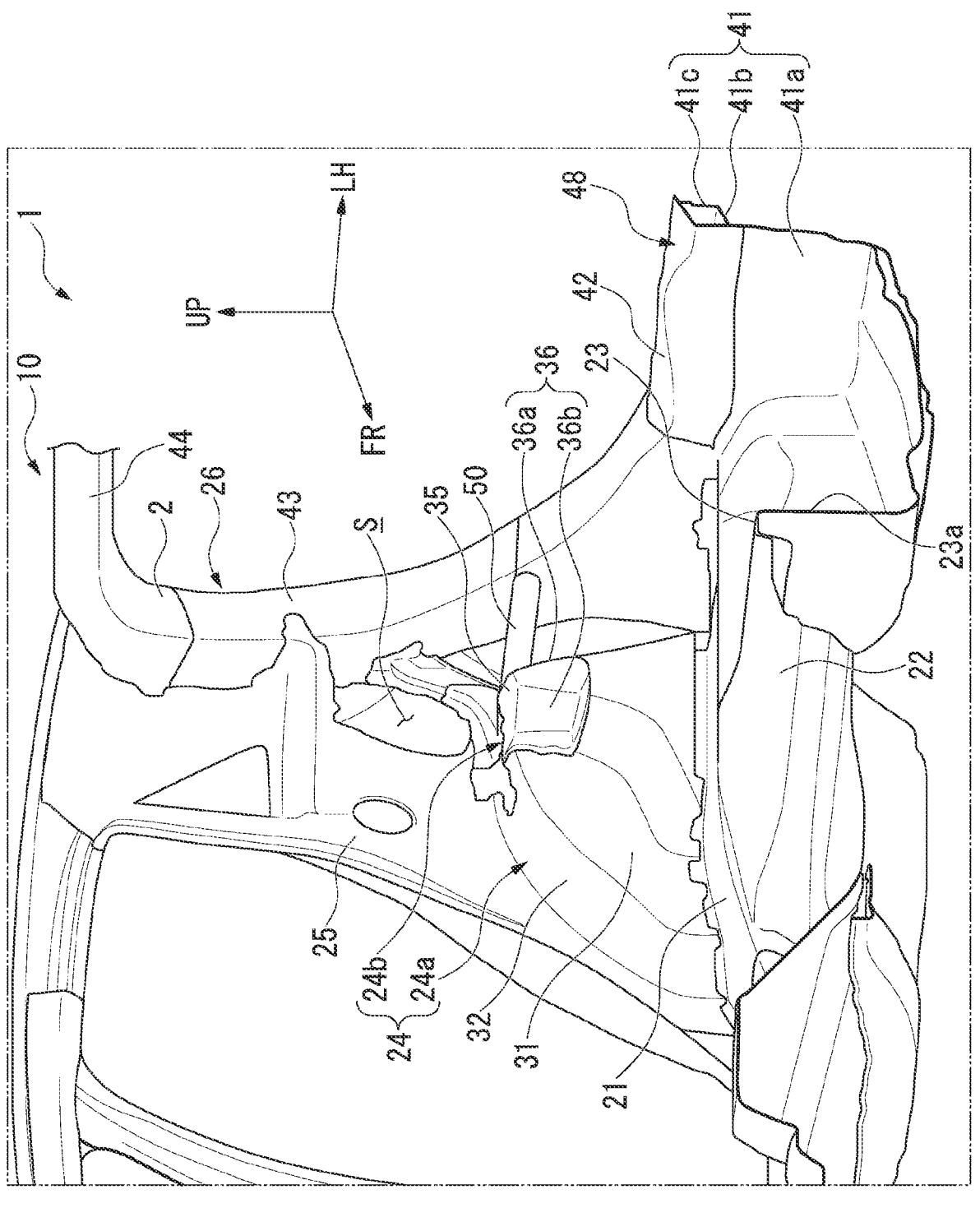
FIG. 1 is a perspective diagram of a vehicle rear structure viewed from a front thereof.

The embodiments of the present invention will be described below based on the drawings. In the following description, the orientation such as forward, backward, up, down, left, right, etc. is the same as that in a vehicle 1 unless otherwise noted. In this case, an arrow FR in the drawings indicates a front of the vehicle 1, an arrow UP in the drawings indicates an upper side of the vehicle 1, and an arrow LH in the drawings indicates a left side of the vehicle 1. In the following description, expressions that represent a relative or absolute arrangement, such as "parallel," "orthogonal," "centered," "coaxial," etc., shall not only represent strictly such an arrangement, but also represent a state relatively displaced with tolerance or an angle or distance sufficient to provide the same function.

Figure 2:
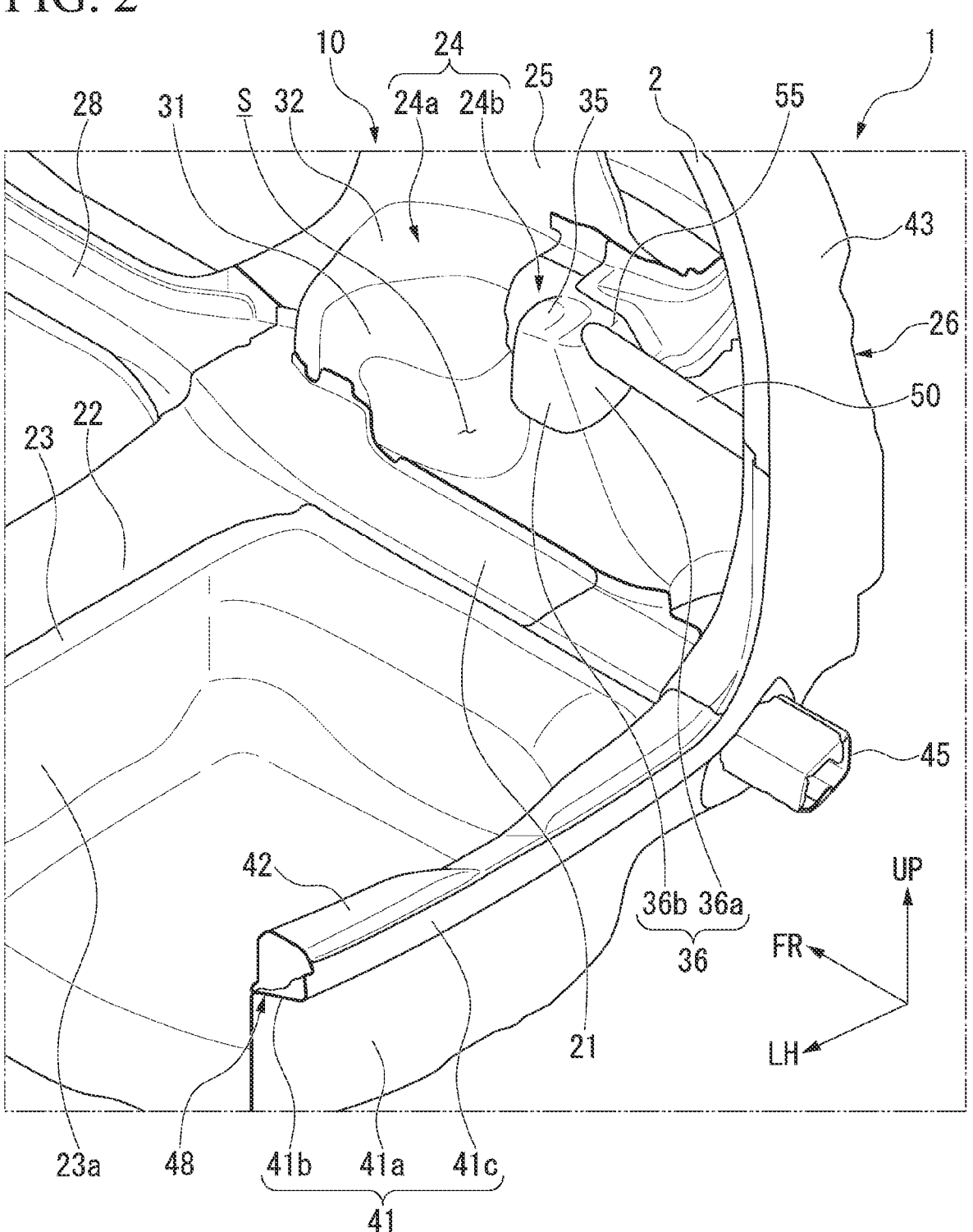
FIG. 2 is a perspective diagram of the vehicle rear structure viewed from a rear thereof.

FIG. 1 is a perspective diagram of a vehicle rear structure 10 viewed from a front thereof. FIG. 2 is a perspective diagram of the vehicle rear structure 10 viewed from a rear thereof.

The vehicle 1 shown in FIGS. 1 and 2 is a so-called hatchback type, in which a cargo compartment opening 2 can be opened and closed by a tailgate (not shown). The vehicle 1 is equipped with the vehicle rear structure 10 at a rear of a vehicle body. The vehicle rear structure 10 is generally symmetrical. For this reason, the same symbols are attached to the corresponding parts on both sides, and explanations are omitted as appropriate.

The vehicle rear structure 10 has a pair of rear side frames 21, a center cross member 22, a floor panel 23, a pair of rear wheel houses 24, a rear side panel 25, and a rear panel 26.

The rear side frames 21 are provided at each of both ends in the vehicle width direction in the vehicle 1. The rear side frames 21 have a closed cross-sectional structure, for example, rectangular in cross-section. Each rear side frame 21 extends rearward from the side sill 28 (see FIG. 2). The rear side frames 21 are configured to be able to be broken by applying pressure in a front-rear direction when an impact load is applied from the rear of the vehicle 1.

The center cross member 22 bridges the front ends of each rear side frame 21 to each other in the vehicle width direction.

The floor panel 23 constitutes a floor surface of a cargo compartment S. Specifically, the floor panel 23 is provided in an area enclosed by the center cross member 22, the rear side frame 21 and the rear panel 26 (an under panel 41 described below). A front end edge of the floor panel 23 is joined to the center cross member 22. Both end edges of the floor panel 23 in the vehicle width direction are joined to the corresponding rear side frames 21, respectively. A rear end edge of the floor panel 23 is joined to the rear panel 26. The floor panel 23 has a tire pan 23a that is recessed downwardly with respect to a top surface of the center cross member 22 and the rear side frame 21.

The rear wheel house 24 is provided outside of the vehicle in the vehicle width direction with respect to each rear side frame 21. The rear wheel house 24 has a wheelhouse main body 24a and a damper base (damper load receiving portion) 24b.

The wheelhouse main body 24a is formed in a concave shape that is open toward the outside and downward in the vehicle width direction. The wheelhouse main body 24a accommodates a portion of the rear wheel (not shown) from the outside in the vehicle width direction relative to the wheelhouse main body 24a. Specifically, the wheelhouse main body 24a has a house longitudinal wall 31 and a house perimeter wall 32. The house longitudinal wall 31 extends upwardly from an outside end edge of the rear side frame 21 in the vehicle width direction. The house longitudinal wall 31 is formed in a semicircular shape protruding upwardly when viewed from the vehicle width direction (side view). The house perimeter wall 32 extends outwardly in the vehicle width direction from an outer edge of the house longitudinal wall 31. The house perimeter wall 32 has an upwardly projecting arch shape in the side view.

The damper base 24b is provided at a top of the wheelhouse main body 24a. An upper end of a damper (not shown) is connected to the damper base 24b. Specifically, the damper base 24b has a top wall portion 35 and a corner portion 36. The top wall portion 35 covers a middle portion (uppermost portion) of the house perimeter wall 32 in the front-rear direction from above. An outside end edge and a front end edge of the top wall portion 35 in the vehicle width direction are joined to the house perimeter wall 32. The corner portion 36 has a rear side portion 36a connected to a rear end edge in the top wall portion 35 and an inner side portion 36b connected to an inside end edge in the vehicle width direction in the top wall portion 35.

The rear side portion 36a extends downwardly following the house perimeter wall 32 as it extends rearward. A lower end edge of the rear side portion 36a and an outside end edge of the rear side portion 36a in the vehicle width direction are joined to the house perimeter wall 32.

The inner side portion 36b extends downwardly following the house longitudinal wall 31. A rear end edge of the inner side portion 36b is continued to the front end edge of the rear side portion 36a. A lower end edge and a front end edge of the inner side portion 36b are joined to the house longitudinal wall 31.

The rear side panel 25 constitutes a side of the cargo compartment S. The rear side panels 25 are provided on both sides of the vehicle 1 in the rear of the vehicle 1 in the vehicle width direction, respectively. The rear side panels 25 extend upwardly from an outside end edge of the wheelhouse main body 24a in the vehicle width direction. A portion enclosed by the wheelhouse main body 24a, the floor panel 23, the rear side panel 25, a roof panel (not shown) and the tailgate (not shown) constitutes the cargo compartment S.

The rear panel 26, together with the tailgate, constitutes a rear surface of the cargo compartment S. The rear panel 26 is a frame-shaped member viewed from the front-rear direction (front view). An inside of the rear panel 26 constitutes the cargo compartment opening 2. That is, when the tailgate is in an open position, the cargo compartment S is opened through the cargo compartment opening 2. On the other hand, when the tailgate is in a closed position, the cargo compartment opening 2 is closed.

The rear panel 26 has the under panel 41, the rear panel center member 42, the pair of rear pillars (rearward connection portions) 43, and a roof cross member 44 (see FIG. 1).

The under panel 41 is formed in a crank shape in the side view. Specifically, the under panel 41 has a lower plate portion 41a, a bent portion 41b, and an upper plate portion 41c.

The lower plate portion 41a extends in the vehicle width direction, the thickness direction thereof being the front-rear direction. The lower plate portion 41a bridges the rear ends of the rear side frames 21. A portion of the lower plate portion 41a located between the rear side frames 21 is joined to the rear end edge of the floor panel 23 (tire pan 23a). An extension 45 (see FIG. 2) is provided at a position of the lower plate portion 41a overlapping each rear side frame 21 in the front view. The extension 45 is a tubular member protruding rearward from the under panel 41. The extensions 45 are configured to be able to be broken by applying pressure in the front-rear direction when an impact load is applied from the rear of the vehicle 1. A rear bumper beam (not shown) is provided at s rear end portion of each extension 45 to bridge the rear end portions of the extensions 45.

The bent portion 41b extends rearward from an upper end edge of the lower plate portion 41a. In the illustrated example, the bent portion 41b extends upward as it extends rearward.

The upper plate portion 41c extends upwardly from the rear end edge of the bent portion 41b.

The rear panel center member 42 is provided at an upper end portion of the under panel 41. The rear panel center member 42 is formed into an L-shape in the side view and extends in the vehicle width direction. The rear panel center member 42 is joined to the upper end portion of the lower plate portion 41a and the upper end portion of the upper plate portion 41c from the front, and together with the bent portion 41b and the upper plate portion 41c, forms a closed section (hereinafter, the closed section 48) having a rectangular shape in the side view.

The pair of rear pillars 43 extend upwardly from both ends in the vehicle width direction in the rear panel center member 42. Each rear pillar 43 has a closed cross-sectional structure in cross-sectional view viewed from the vertical direction. In the illustrated example, the lower end of each rear pillar 43 is joined to the rear panel center member 42 at an inner end in the vehicle width direction and to the corresponding rear side frame 21 at an outer end in the vehicle width direction. Corresponding (located on the same side in the vehicle width direction) rear pillars 43 and rear wheel houses 24 face each other in the front-rear direction.

The roof cross member 44 bridges the upper end portions of each rear pillar 43 in the vehicle width direction. The roof cross member 44 has a closed cross-sectional structure in cross-sectional view viewed from the vehicle width direction.

Here, a rear panel support member 50 is provided above the rear side frame 21 and the rear panel center member 42, between the rear wheel house 24 and the rear pillar 43, which face each other in the front-rear direction. The rear panel support member 50 is a cylindrical member extending in the front-rear direction. Specifically, the rear panel support member 50 extends in a straight line downwardly as it extends rearward. The rear panel support member 50 may extend in a slanting direction in the vehicle width direction (e.g., inwardly in the vehicle width direction) as it extends rearward.

A front end portion of the rear panel support member 50 is joined to the damper base 24b. In this embodiment, a front end edge of the rear panel support member 50 is joined to the top wall portion 35 and the rear side portion 36a of the damper base 24b while straddling the ridge portion 55 (see FIG. 2) between the top wall portion 35 and the rear side portion 36a. Therefore, the front end portion of the rear panel support member 50 is located at a height equivalent to or higher than the top of the rear wheel.

On the other hand, a rear end edge of the rear panel support member 50 is joined to the rear pillar 43. It is preferred that a reinforcement member (not shown) such a bulkhead be provided at a position inside the rear pillar 43 that overlaps the connection point with the rear panel support member 50 in the front view. The rear panel support member 50 may be joined to the damper base 24b and the rear pillar 43 via a bracket or the like.

In the vehicle width direction, the rear panel support member 50 is positioned between the rear side panel 25 and the rear side frame 21. Accordingly, the rear panel support member 50 is spaced apart from an inner surface of the rear side panel 25. At least a portion of the rear panel support member 50 may overlap the rear side frame 21 in plan view.

Figure 3:
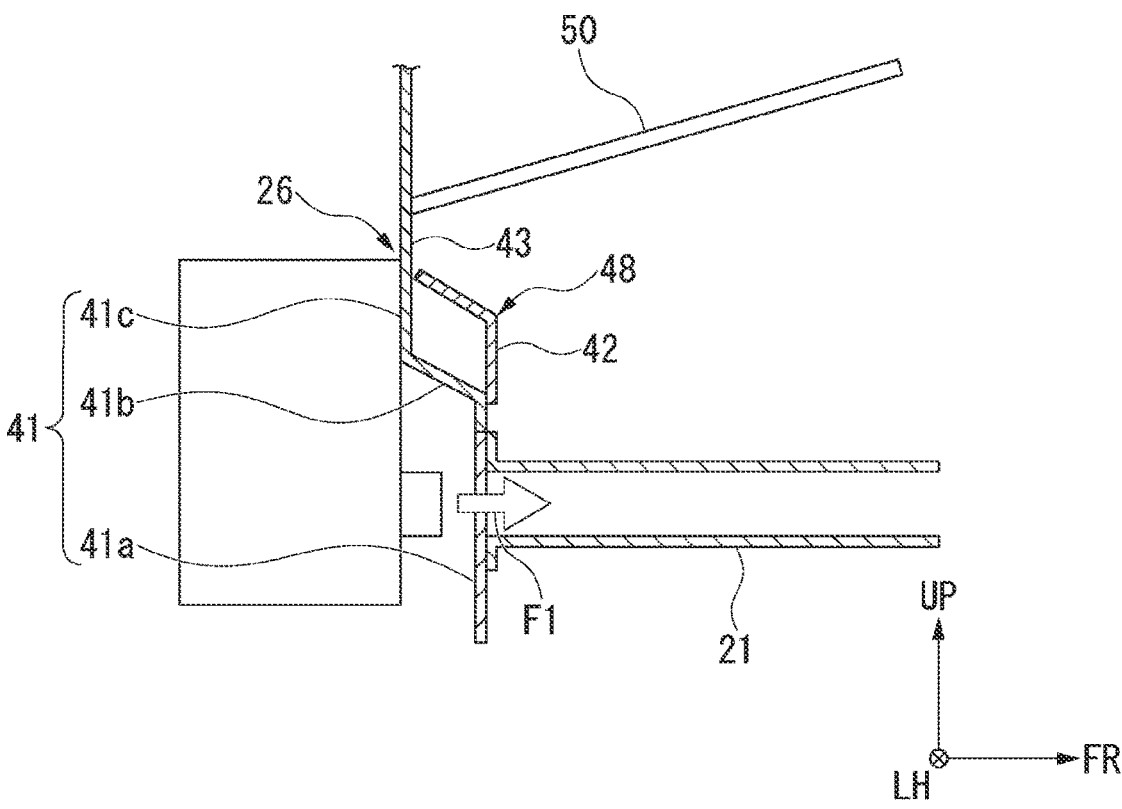
FIG. 3 is a schematic diagram of the vehicle rear structure viewed from a side thereof.
Figure 4:
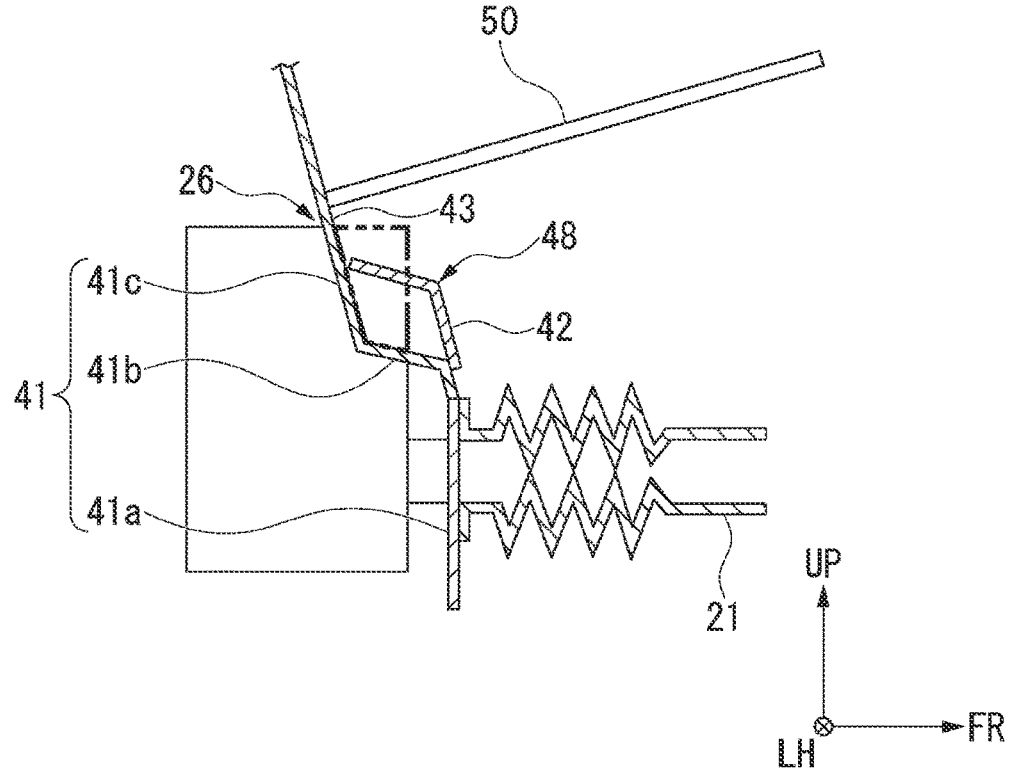
FIG. 4 is a schematic diagram of the vehicle rear structure viewed from the side.

Next, a behavior of the vehicle rear structure 10 will be described using FIGS. 3 and 4. FIGS. 3 and 4 are schematic diagrams of the vehicle rear structure 10 viewed from a side thereof. The following description describes a behavior when a barrier 100 impacts a portion of the vehicle 1 that is located lower than the rear panel support member 50 (e.g., a lower area of the rear panel 26 including the closed section 48) from the rear of the vehicle 1.

As shown in FIGS. 3 and 4, in a rear collision, when the barrier 100 impacts the lower area of the rear panel 26 from the rear of the vehicle 1, a forward-oriented collision load F1 is applied to the vehicle rear structure 10. A part of the collision load F1 is transmitted to the rear side frame 21 through the under panel 41 and the like. This causes the rear side frame 21 to compress and deform forward, thereby reducing the collision load F1. On the other hand, a part of the collision load F1 is transmitted through the rear pillar 43 to the rear panel support member 50, and then gradually reduced in a process of being transmitted to the rear wheel house 24.

Here, when the collision load F1 is input to the lower area of the rear panel 26, only the rear side frame 21 is deformed out of the rear side frame 21 and the rear panel support member 50. As a result, the lower area of the rear panel 26 is displaced forward starting from the rear panel support member 50. At this time, a tension (tensile load) is generated in the lower area of the rear panel 26, thereby reducing the collision load F1.

In the vehicle rear structure 10 of this embodiment, the rear panel support member 50 is provided above the rear panel center member 42, extending in the front-rear direction and bridging between the rear pillar 43 and the rear wheel house 24.

According to this configuration, in a rear collision, a collision load input from the rear of the vehicle 1 is transmitted to both the rear side frame 21 and the rear panel support member 50 via the rear panel 26. This allows the collision load F1 to be dispersed, thereby effectively reducing the collision load F1.

Moreover, in this embodiment, since the rear panel center member 42 and the rear panel support member 50 are connected via the rear pillar 43, the lower area of the rear panel 26 is displaced forward starting from the rear panel support member 50 when the collision load F1 is input. As a result, the tension generated in the lower area of the rear panel 26 can reduce the collision load F1. In this case, the deformation of the rear panel support member 50 itself can be suppressed and the impact load F1 can be reduced while reducing the amount of the collision object entering the vehicle 1. Thus, in this embodiment, since the lower area of the rear panel 26 is displaced starting from the rear panel support member 50 in the rear collision, the rear panel support member 50 can be positioned relatively high up to reduce the collision load F1 by equivalent behavior with respect to the collision load F1 input to the lower area of the rear panel 26. Therefore, it is easy to ensure the same collision safety in a wide range of the vertical direction.

In the vehicle rear structure 10 of this embodiment, the front end of the rear panel support member 50 is configured to be connected to the damper base 24b.

According to this configuration, the front end of the rear panel support member is connected to the damper base 24b which reinforces the wheelhouse main body 24a, so that the rear panel support member 50 can be firmly supported from the front. This prevents the rear panel support member 50 itself from being displaced forward when the collision load F1 is input. As a result, the lower area of the rear panel 26 can be effectively displaced, and the tension generated in the lower area of the rear panel 26 can easily reduce the collision load F1.

In the vehicle rear structure 10 of this embodiment, the front end of the rear panel support member 50 is configured to be connected across the ridge portion 55 between the top wall portion 35 and the rear side portion 36a of the damper base 24b.

According to this configuration, the rigidity of the connection point of the rear panel support member 50 can be easily secured, and thus the displacement of the rear panel support member 50 itself forward when the collision load F1 is input can be more reliably suppressed.

In the vehicle rear structure 10 of this embodiment, the rear pillar 43 is provided with the reinforcement member at the position inside the rear pillar 43 that overlaps the connection point with the rear panel support member 50 in the front view.

According to this configuration, it is easier to secure the strength of the rear pillar 43, and thus it is possible to suppress the fracture of the connection point of the rear pillar 43 with the rear panel support member 50 when the collision load F1 is input. As a result, the lower area of the rear panel 26 can be effectively displaced, and the tension generated in the lower area of the rear panel 26 can easily reduce the collision load F1.

In the vehicle rear structure 10 of this embodiment, the rear panel support member 50 is configured to extend in a straight line downwardly as the rear panel support member 50 extends rearward.

According to this configuration, the lower area of the rear panel 26 is easily displaced forward at the time of the collision load input, starting from the rear panel support member 50. As a result, the tension generated in the lower area of the rear panel 26 can efficiently reduce the collision load F1.

In the vehicle rear structure 10 of this embodiment, the rear panel support members 50 are configured to bridge between the pair of rear pillars 43 and the damper base 24b, respectively.

According to this configuration, the collision safety can be improved while securing the opening area of the cargo compartment opening 2 of the vehicle 1.

[Other Variations]

Although the above described preferred examples of the present invention, the present invention is not limited to these examples. Additions, omissions, substitutions, and other changes to the configuration are possible to the extent that they do not depart from the intent of the invention. The invention is not limited by the foregoing description.

For example, in the embodiment described above, a case where the damper base 24b is taken as an example of the forward connection portion is described, but is not limited to this configuration. The forward connection portion may be, for example, the wheelhouse main body 24a, a rear seat, a center pillar, a roof, etc.

In the embodiment described above, a case where the rear pillar 43 is taken as an example of the rearward connection portion is described, but is not limited to this configuration. The rearward connection portion may be a configuration which is continued upwardly from the rear panel center member 42, and in which the rear end of the rear panel support member 50 is connected above the rear panel center member 42.

In the embodiment described above, a configuration where a pair of the rear panel support members 50 is provided on both sides in the vehicle width direction is described, but is not limited to this configuration. However, the rear panel support member 50 may be provided in one, three, or more.

In addition, to the extent not departing from the purpose of the invention, it is possible to replace the component elements in the above-described embodiments with well-known component elements, and the above-described variations may be combined as appropriate.

What is claimed is:

1. A vehicle rear structure comprising:
a rear panel having a rear panel center member extending in a vehicle width direction and a rearward connection portion extending upward from the rear panel center member;
a forward connection portion located forward of the rear panel;
a rear panel support member extending in a front rear direction above the rear panel center member and bridging between the rearward connection portion and the forward connection portion;
a rear side panel constituting a side of a cargo compartment; and a rear side frame provided at an end in the vehicle width direction in the vehicle and extending in the front rear direction, wherein the rear panel support member is positioned between the rear side panel and the rear side frame.

2. The vehicle rear structure according to claim 1, wherein the forward connection portion includes a wheelhouse main body in which a portion of a rear wheel is accommodated and a damper load receiving portion provided inside a vehicle with respect to the wheelhouse main body, and wherein a front end of the rear panel support member is connected to the damper load receiving portion.

3. The vehicle rear structure according to claim 2, wherein the damper load receiving portion includes a top wall portion covering the wheelhouse main body from above and a corner portion extending downwardly from an outer edge of the top wall portion and covering the wheelhouse main body from rear, and wherein the front end of the rear panel support member is connected across a ridge portion between the top wall portion and the corner portion of the damper load receiving portion.

4. The vehicle rear structure according to claim 1, wherein the rearward connection portion has a closed cross-sectional structure, and wherein an inside of a portion of the rearward connection portion, to which a rear end of the rear panel support member is connected, is reinforced.

5. The vehicle rear structure according to claim 1, wherein the rear panel support member extends downwardly as the rear panel support member extends rearward.

6. The vehicle rear structure according to claim 1, wherein the rearward connection portion includes a pair of rear pillars extending upwardly from both ends of the rear panel center member to divide a cargo compartment opening of the vehicle, wherein a pair of the rear panel support members is provided on both sides in the vehicle width direction, wherein a pair of the forward connection portions is provided on the both sides in the vehicle width direction, and wherein the pair of the rear panel support members bridges the pair of the rear pillars and the pair of the forward connection portions on the both sides, respectively.

* * * * *